US006582136B1

(12) United States Patent
Vincent et al.

(10) Patent No.: US 6,582,136 B1
(45) Date of Patent: Jun. 24, 2003

(54) PROCESSING CONTROL TOOL

(75) Inventors: Sheridan E. Vincent, Rochester, NY (US); Peter VanderBrook, Rush, NY (US); John A. Weldy, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/079,315

(22) Filed: Feb. 20, 2002

(51) Int. Cl.[7] ........................ G03B 27/32; G03D 13/00

(52) U.S. Cl. .......................... 396/578; 355/40; 355/77; 356/402; 396/639

(58) Field of Search ................................ 396/567–570, 396/639, 578; 355/32–41, 77; 356/404, 408, 425, 402; 347/131; 378/182, 207; 348/19

(56) References Cited

U.S. PATENT DOCUMENTS

| | | | | | |
|---|---|---|---|---|---|
| 182,099 | A | | 9/1876 | Brice | |
| 3,995,959 | A | | 12/1976 | Shaber | |
| 4,335,956 | A | | 6/1982 | Findeis et al. | |
| 4,588,298 | A | | 5/1986 | Nakamura | |
| 4,642,276 | A | | 2/1987 | Burtin | |
| 5,223,891 | A | * | 6/1993 | Fierstein et al. | 355/77 |
| 5,319,408 | A | * | 6/1994 | Shiota | 396/569 |
| 5,406,612 | A | * | 4/1995 | Galkin | 378/182 |
| 5,440,365 | A | * | 8/1995 | Gates et al. | 396/570 |
| 5,883,699 | A | * | 3/1999 | Kuramitsu et al. | 355/40 |
| 6,115,062 | A | * | 9/2000 | Milson et al. | 358/527 |
| 6,128,090 | A | * | 10/2000 | Hunsel et al. | 347/131 |
| 6,154,272 | A | * | 11/2000 | Vanderbrook | 355/40 |

OTHER PUBLICATIONS

D.A. Spencer; Colour Photography in Practice; 1966 Focal Press Limited; p. 208.

* cited by examiner

*Primary Examiner*—D Rutledge
(74) *Attorney, Agent, or Firm*—Frank Pincelli

(57) ABSTRACT

A control tool for monitoring a predetermined process condition in a photographic process and method of making the control tool. The control tool includes a support element having a plurality of rows, each row having a plurality of visual density patches and representing a different process condition. At least one of the rows is used for monitoring a process condition being monitored and at least one of the other of the rows identifies an out-of-control process condition. The plurality of rows of visual density patches are designed to be correlated with a process control strip that has been processed in the photographic process to be monitored, the support element further having textual information identifying at least one process condition and describing the process condition that may need to be corrected in response to correlation of the control strip to the control tool.

22 Claims, 7 Drawing Sheets

PROCESSING CONTROL TOOL

FIELD OF THE INVENTION

The present invention is directed to a control tool for use with a control strip to monitor process conditions in a photographic process.

BACKGROUND OF THE INVENTION

In current use, a control strip is used to monitor processes and photographic processing systems. The particular control strip requires that it be used with a densitometer which is an electronic device that measures the density of the patches provided on a control strip. Once the densities are determined, the results are compared with densities that have been predetermined for the control strip. Once the results are obtained they are compared with a reference document or computer program loaded onto a computer. Based on the pattern of the determined densities relative to the reference control strip the potential causes of any deviation from the desired aim are determined.

A disadvantage with prior art systems is that the cost of the densitometer is typically several thousands of dollars. This can be a significant problem particularly with small retailers having small operations or in developing countries or areas where the cost of a densitometer is substantial. The failure to use a densitometer often leads to the photofinishing operation in a state that is less than optimal.

Another problem associated with prior art systems is that typically the processor operator or quality control technician runs a control strip at the start of production or during a production run. Often the start of production is delayed until the results of the control strip are verified. This delay in time is very unproductive and can result in more expensive operation due to the additional cost of maintaining the personnel waiting for process control verification. If the analysis of the control strip determines that there is a problem, with the prior art the technician will often typically go to other reference manuals to determine the cause of the problem and then proceed to outline a procedure for the solving of the problem.

Thus, there is a need to provide a system whereby the determination of whether the photographic process is within tolerance and can be done quickly and in an economic manner.

SUMMARY OF THE INVENTION

In accordance with one aspect of the present invention there is provided a control tool for monitoring a predetermined process condition in a photographic process, comprising:

- a support element having a plurality of rows, each row having a plurality of visual density patches and representing a different process condition;
- at least one of the rows is used for monitoring a process condition being monitored and at least one of the other of the rows identifies an out-of-control process condition;
- the plurality of rows of visual density patches are designed to be correlated with a process control strip that has been processed in the photographic process to be monitored, the support element further having textual information identifying at least one process condition and describing the process condition that may need to be corrected in response to correlation of the control strip to the control tool.

In accordance with another aspect of the present invention there is provided a method for making a control tool for use in monitoring a photographic process, comprising the steps of:

- using a graphic computer program to produce a digital image file, the digital image file containing data for the printing of density patches on a photographic media and a second separate file for printing text on the photographic media; and
- printing the density patches and text on the media using the two separate files.

In accordance with yet another aspect of the present invention there is provided a control tool for monitoring a predetermined process condition in a photographic process, comprising:

- a support element having two rows, each row having a plurality of visual density patches and representing a different process condition, one of said rows is used for monitoring an upper process limit condition and the other one of two rows identifies a lower process limit condition; and
- the two rows of visual density patches are designed to be correlated with a process control strip that has been processed in the photographic process to be monitored, the support element further having textual information identifying at least one process condition and describing the process condition that may need to be corrected in response to correlation of the control strip to the control tool.

DETAILED DESCRIPTION OF THE INVENTION

Figure 1:
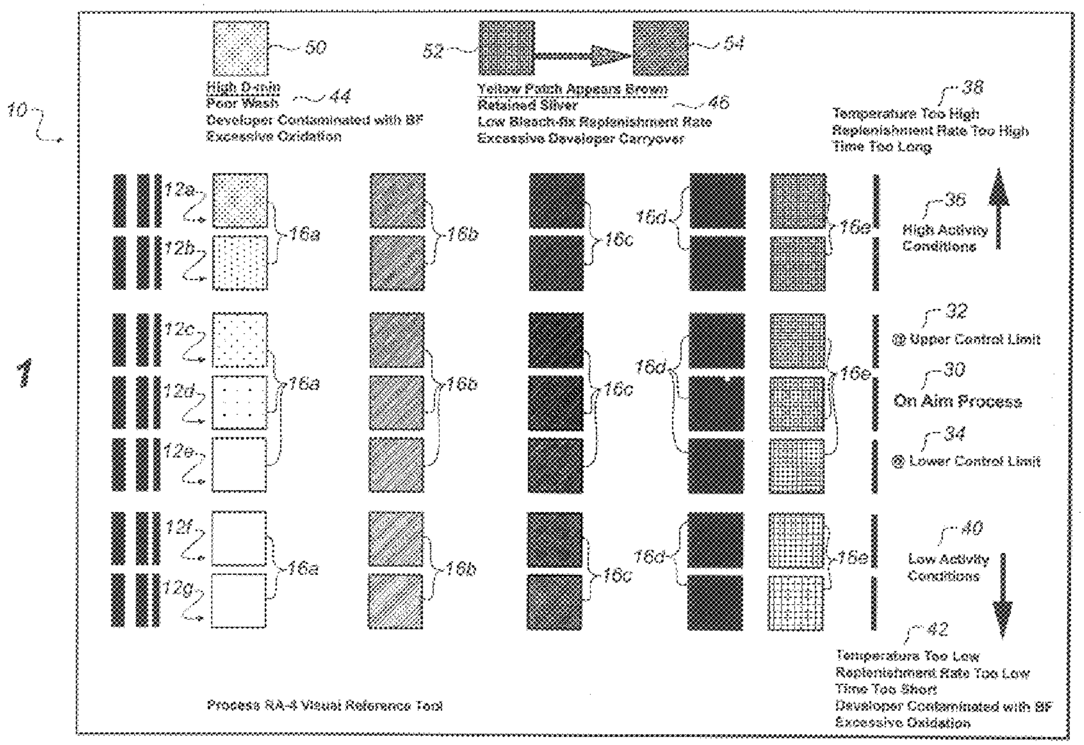
FIG. 1 illustrates a control tool made in accordance with the present invention.

Referring to FIG. 1 there is illustrated a control tool 10 for use in monitoring a photographic paper process. The control tool is typically a support element, such as photographic paper on which a plurality of rows 12*a*, 12*b*, 12*c*, 12*d*, 12*e*, 12*f* and 12*g*, each of the rows having a plurality of visual density patches 16*a*, 16*b*, 16*c*, 16*d* and 16*e*. Each of the density patches 16*a*–16*e* represent a different density region. Whereas each of the rows of density patches represents a different processing condition. In the particular embodiment illustrated, row 12*d* represents what is referred to as "AIM." That is the desired condition in which a control strip 20, such as illustrated in FIG. 2, which if compared, the control tool 10 will designate that the paper process is in control.

As can be seen, each row 12*a*–12*g* comprises five separate patches and are positioned so as to produce five vertical rows 16*a*, 16*b*, 16*c*, 16*d* and 16*e* respectively. In the particular embodiment illustrated, patches in column 16*a* represent the minimum density of the photographic paper of the example, where no exposure has been made. It represents the density region that is seen as white with the photographic paper. The patches in column 16*b* represent the LD or "low density" region of the density range and represents a medium-gray with the photographic paper. The LD patch is the patch that typically has the greatest sensitivity to visual change to typical process variations. The patches in column 16*c* represent the HD or "high density" region of the density range and represents a dark gray with the photographic paper. The patches in column 16*d* each represent BP or "black (patch)" region of the density range density range and represents the darkest, black with the photographic paper, and each of the patches in column 16*e* represent a yellow colored density. In this example the yellow patch is a visual measure of the degree that the paper has retained undesired levels of developed silver that desaturate the purity of the yellow color, turning it brown when silver is not adequately removed from the photographic paper. These parameters are well known to those of ordinary skill in the art and are often used to monitor the process conditions of photographic paper processes. It is of course understood that the patches may represent any appropriate density range parameters that are desired to be monitored.

Figure 2:
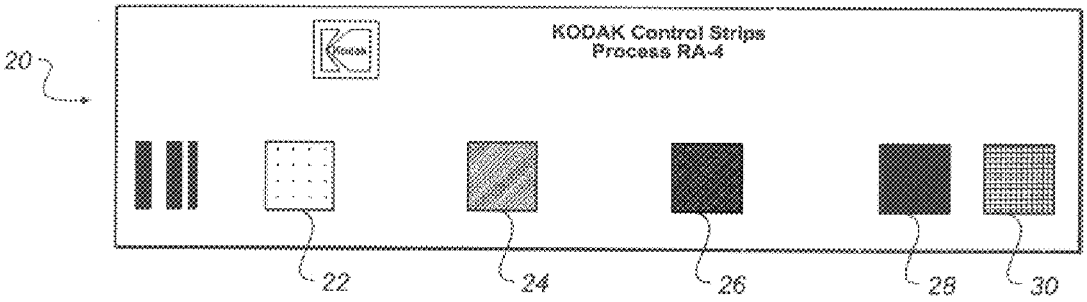
FIG. 2 is a control strip for use with a control tool of FIG. 1.

Referring to FIG. 2 there is illustrated a control strip 20. The control strip 20 includes a plurality of density patches 22, 24, 26, 28 and 30, each corresponding to one of the parameters in columns 16*a*–16*e*. The control strip 20 is manufactured such that when it is processed by a photographic processor it can be compared with the control tool 10 for determining whether the monitored parameters are at AIM or within acceptable limits of AIM. In particular, the density patch 22 is designed to be compared with the Dmin parameter in column 16*a*, the density patch 24 is designed to be measured with parameter LD in column 16*b*, the patch 26 is designed to be compared with the HD parameter of column 16*c* and the density patch 28 is designed to be compared with the patches in column 16*d* and the density patch 30 is compared with the density patches in column 16*e*.

When the process through which the control strip 20 is at AIM, the color and density of these density patches will substantially visually match the color and density of the density patches in row 12*d* for column 16*a*–16*e*. In the particular embodiment illustrated, row 12*d* illustrates the desired AIM for the process. Whereas rows 12*c* and 12*e* illustrate the range of the densities that are within acceptable limits for the measured parameters. This is in contrast to rows 12*a* and 12*b* which illustrate the values for the density patches that are outside the acceptable AIM range and requires corrective action to the process so that it is operating properly. Likewise, the density patches of rows 12*f* and 12*g* are also outside the acceptable AIM values, however, in a different direction requiring different corrective action. The various density patches for each of the columns 16*a*–16*e* all have a predetermined density value different from each other. However, each of the columns has a different progression of densities for the rows 12*a*–12*g*. Likewise, each of the rows 12*a*–12*g* has different densities as you proceed from columns 16*a*–16*e*.

The control tool 10 is also provided with various text 30, 32, 34, 36, 38, 40, 42, 44 and 46 which provides information as to the condition of the monitored process, possible cause of the out-of-control condition, and possible solutions that need to be considered to correct the out-of-control conditions. As can be seen text items 30, 32 and 34 identify the AIM, upper control limit, and lower control limit for acceptable conditions. Whereas the text 36 provides information as to the out-of-control condition of high activity for the monitored parameters and text 38 provides information with respect as to how to correct the out-of-control condition. Likewise, text 40 provides information about the low activity conditions and text 42 identifies some of the operating conditions that may be the cause, some of which may require corrective action. As can also be seen, the control tool 10 also is provided with additional patches 50, 52, 54 which monitor other parameters independently. In particular, patch 50 is associated with row 16*a* and further describes an out-of-control operating condition. In particular, patch 50 indicates that there is a high Dmin which means that there is poor wash or the developer has been contaminated with bleach-fix solution or possibly excessive oxidation is occurring. Whereas the patches 52, 54 provides further information with regards to the parameter defined by 16*e* and in particular identifies that there is a problem with bleach-fix replenishment rate or there is excessive developer carry over.

Figure 3A:
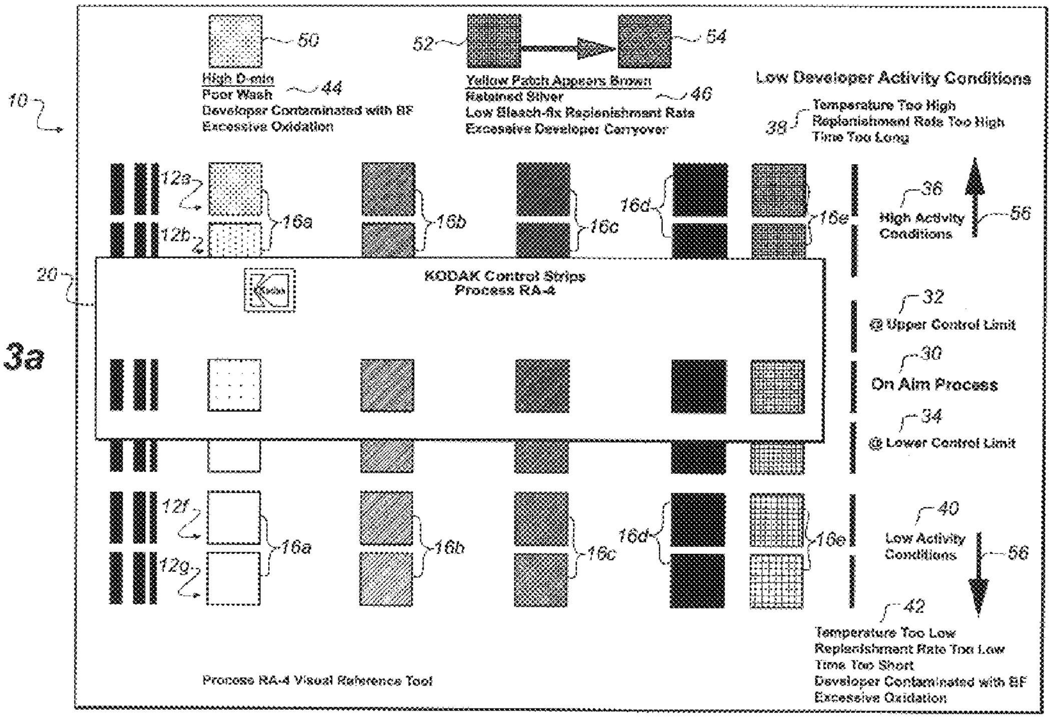
FIGS. 3*a* and 3*b* illustrate how the control strip of FIG. 2 may be used with the control tool of FIG. 1.

Referring to FIG. 3*a* there is illustrated a process control strip 20 that has been passed through a paper processor to be monitored. The control strip 20 is positioned with respect to control tool 10 as illustrated in FIG. 3*a*, so that each of the density patches 22, 24, 26, 28 and 30 substantially align with each of the respective columns 16*a*, 16*b*, 16*c*, 16*d* and 16*e*. The control strip 10 is moved up or down, as shown by arrows 56, until the patches thereon most closely visually match the patches in a row in the control tool 10. If the patches substantially match either of the rows 12*c*, 12*d* or 12*e* the process will be considered within acceptable limits. However, should the patches on control strip 20 correspond to patches in rows 12*a*, 12*b*, 12*f* or 12*g* they will visually indicate that the process is out of the desired AIM limits and corrective action is required. Thus, it can be seen that the operator can quickly determine whether the paper process is within or outside of control limits by quickly and visually analyzing the strip with respect to the control tool 10.

Figure 3B:
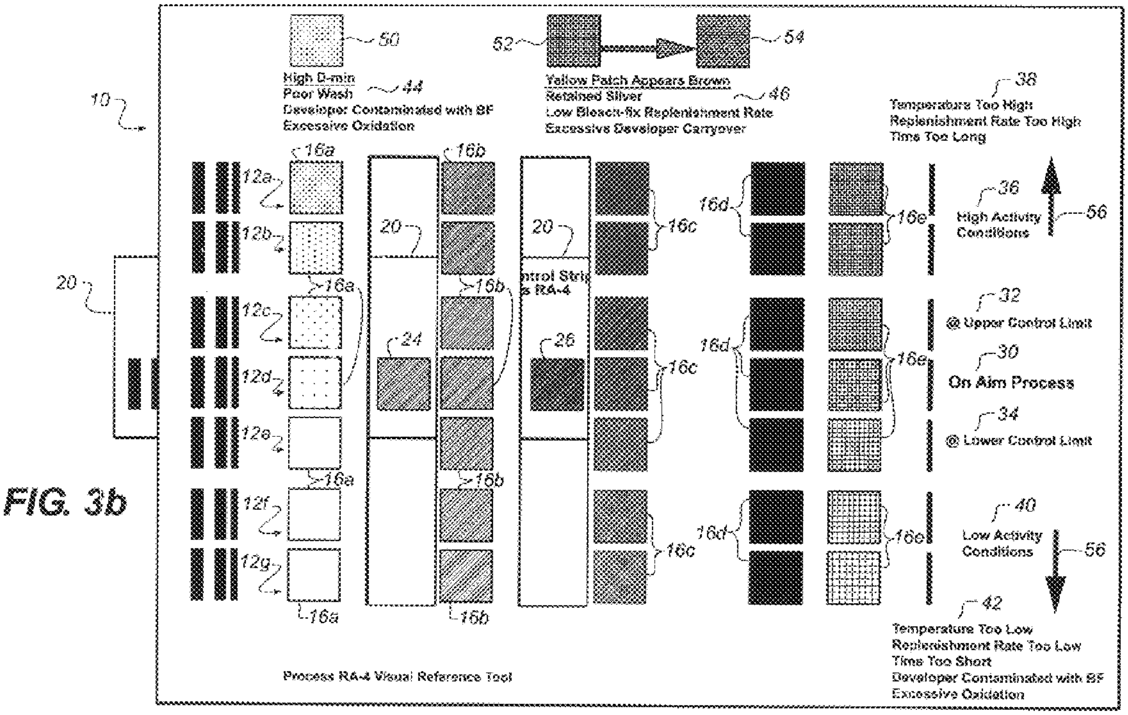

Referring to FIG. 3*b* in the particular embodiment illustrates an alternative method of use. It may be more desirable for the comparison of the control strip 20 with the control tool 10 to have the patches in closer proximity. In this example, a portion of the control tool 10 is cut away leaving a viewing "window". The control strip 20 is placed behind the control tool 10 and moved adjacent to the patches in the rows 12*a*–12*g* that are the best match. The example in FIG. 3*b* shows the viewing window next to columns 16*b* and 16*c*, however, the viewing window can be placed adjacent to any or all of the columns 16*a*–16*e*.

Figure 4:
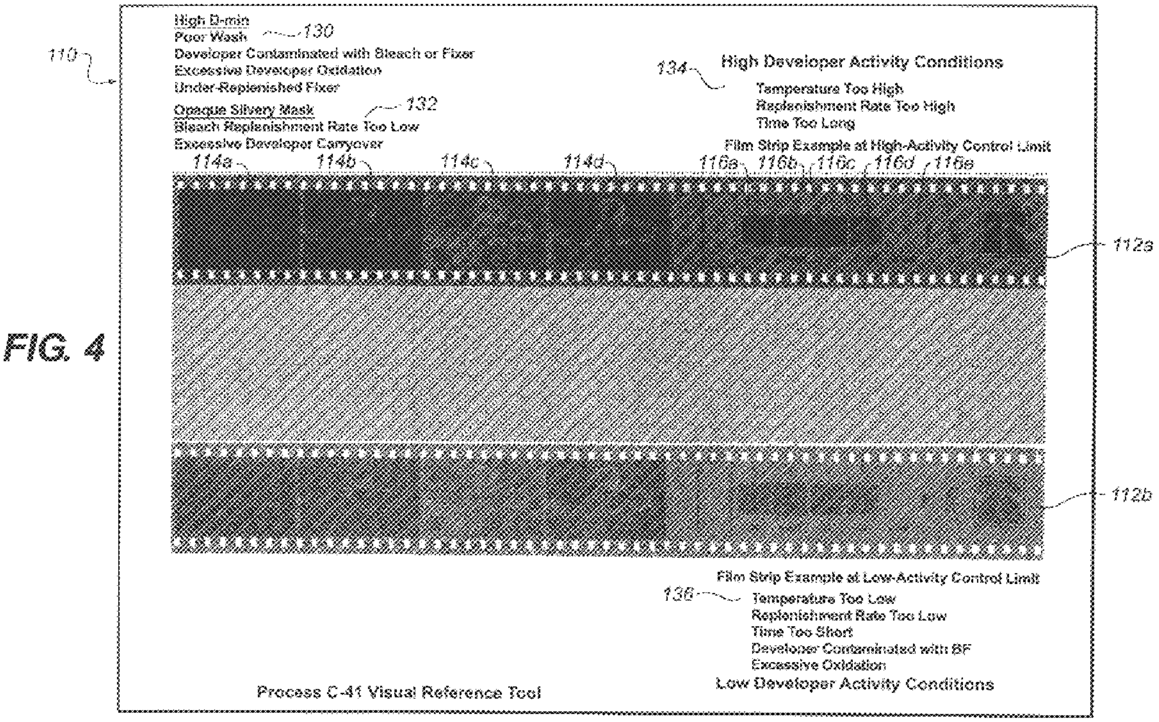
FIG. 4*a* control tool for use in a monitoring and controlling a photographic film process.

Referring to FIG. 4, there is illustrated a control tool 11O designed for use in monitoring a photographic film process. The control tool 110 is designed to be used with the control strip 160 illustrated in FIG. 5. In this particular embodiment illustrated in FIG. 4, control tool 110 illustrates a pair of actual film strips 112*a* and 112*b* secured to a support element 114. These strips 112*a* and 112*b* illustrate the upper and lower limits of the aim conditions for the photographic film process.

The control strips 112*a* and 112*b* illustrates the upper and lower boundaries for exceptable processing conditions for the photographic film process. In the particular embodiment illustrated, each of the strips 112*a* and 112*b* have a plurality of patches illustrating the upper and lower limits for that have been predetermined to demonstrate the range of acceptable processing conditions for the control strip for the film process. The strips 112*a* and 112*b* also are provided with density images 114*a*, 114*b*, 114*c*, 114*d* and density patches 116*a*, 116*b*, 116*c*, 116*d* which are identified in 116*e* which are similar in measuring the parameter set forth in columns 16*a*–16*e* of control tool 10. Images 114*a*–114*d* are negative images with pictorial content that are exposed on the film. In the illustrated embodiment, the are four images 114*a*–114*d* have the same pictorial content, however they have been exposed on the film in a density series with the image 114*a* having more exposure than 114*b*, which is more than 114*c*, which is more than 114*d*. There is also a series of density patches 116*a*–116*e*. The patch 116*a* has an orange appearance and is labeled "Yel" for "yellow" color patch and has the function to demonstrate when developed silver has not been removed fully from the film. Density patch 116*b*, the "Dmax" patch, represents the maximum density range of exposure; density patch 116*c*, the "HD" patch, represents a high density region; density patch 116*d*, the "LD" patch, represents the low density region, and the region of the film identified 116*e* represents a clear area of the film where there has been no pre-exposure, the "Dmin" region. Here, as in the previous embodiment, there is provided text 130, 132, 134, 136 which provides information similar to the information on control tool 10 except directed to a photographic film process conditions.

Figure 5:
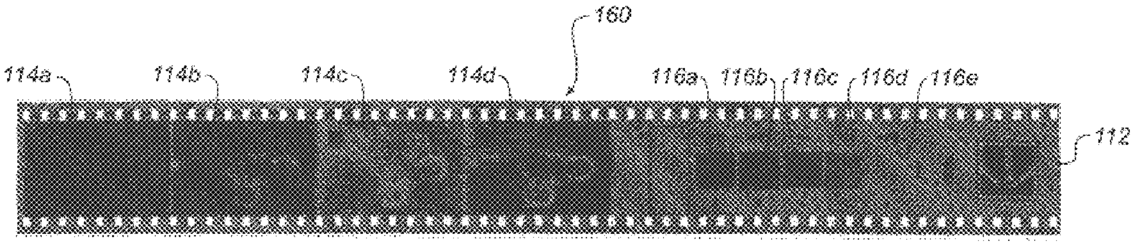
FIG. 5 is an elevational view of a film strip for use with the control tool of FIG. 1.
Figure 6:
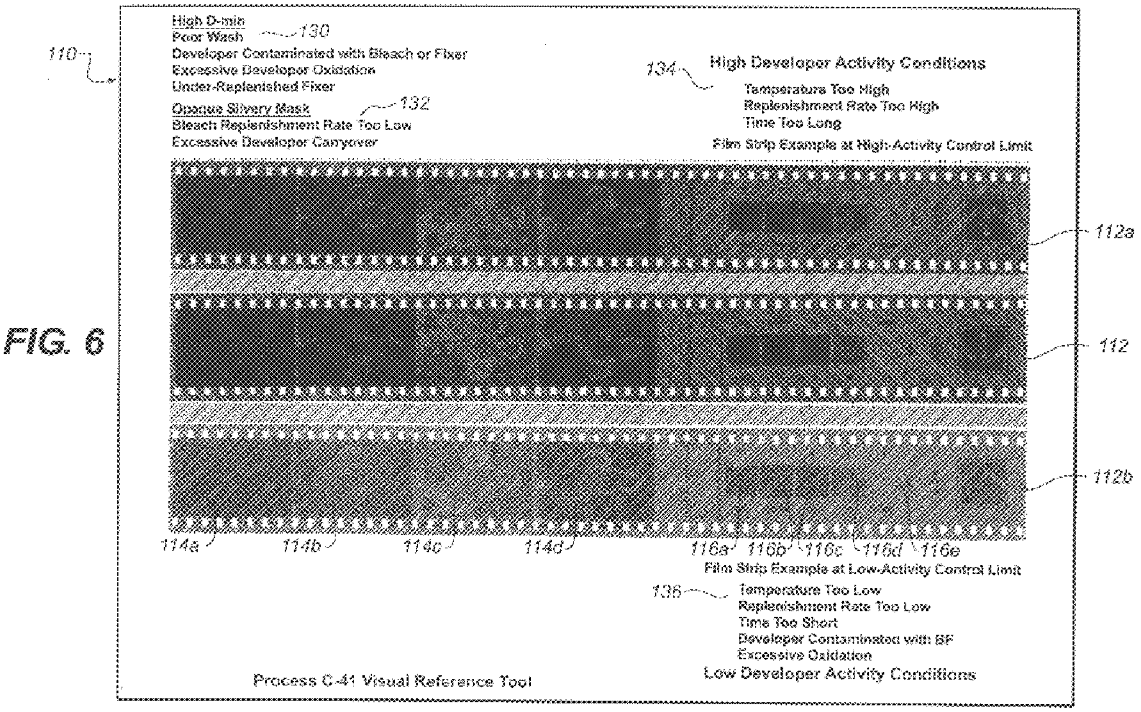
FIG. 6 illustrates how the control strip of FIG. 5 may be used with the control tool of FIG. 4.

FIG. 5 illustrates a film control strip 160 that is developed in the process to be monitored having similar density images 114*a*–*d* and density patches 116*a*–*e*. Once strip 160 has passed through the film processor it is placed in between the two standard tools 112*a* and 112*b*, as illustrated in FIG. 6, to determine whether it is between the upper and lower limits. If it is within the upper and lower limits, the film process is in desired operating parameters. However, should it be outside of the desired operating conditions, there is provided information in the text sections 130, 132, 134, 136 to assist to quickly identify the problem what should be corrected.

Whereas the previous examples have been illustrated as uniform density patches, other embodiments of the invention can be produced with other graphic or pictorial images that can be produced on the control tool for comparison with the graphic or pictorial image on the control strip. The graphical or pictorial images can be used in the place of the patches that were described in the illustrated examples control tool 10 and control tool 110. For example, in FIG. 4, 114*a*–114*d* are images with pictorial content.

In the preferred method of producing the control tool for the paper process, the control tool 10 may be produced by digital processing methods. The image on the control tool 10 and the textual content of visual reference tool 10 is prepared using a graphics computer program such as Adobe® Photoshop®. Once the file has been prepared, it can be rendered to a standard file format such as JPEG or TIFF. The file format can be conveniently transmitted via electronic transmission or on a Zip™ disk or compact disc, or other recordable media to a printing device. The printing device is preferably a digital photographic system such as a Noritsu 2711 digital minilab. In this manner the control tool 10 may be produced on the same photographic media as the photographic element used to produce the control strip 20. The value in doing this is that the control patches and the text can be provided as separate files or as separate layers in an image file such as the Adobe Photoshop file. This is very useful when the control tool is to be divided into various different languages and used throughout the world. Thus, the control tool can be quickly and easily changed to suit the local needs in various countries without the need to reformat the entire tool. The density patches would remain unchanged while the text information could readily be modified for language or content.

Other methods, such as conventional offset printing or printing with an inkjet printer, could also be used to produce the control tool.

It is to be understood that various changes and modifications can be made without departing from the scope of the present invention. The present invention being defined by the claims that follow.

PARTS LIST

| | |
|---|---|
| 10. | Control tool |
| 12a. | Row |
| 12b. | Row |
| 12c. | Row |
| 12d. | Row |
| 12e. | Row |
| 12f. | Row |
| 12g. | Row |
| 20. | Control strip |
| 22. | Density patch |
| 24. | Density patch |
| 26. | Density patch |
| 28. | Density patch |
| 30. | Density patch |
| 32. | Text item |
| 34. | Text item |
| 36. | Text item |
| 38. | Text item |
| 40. | Text item |
| 42. | Text item |
| 44. | Text item |
| 46. | Text item |
| 50. | Patch |
| 52. | Patch |
| 54. | Patch |
| 110. | Control tool |
| 112a. | Film strip |
| 112b. | Film strip |
| 114. | Support element |
| 114a. | Density image |
| 114b. | Density image |
| 114c. | Density image |
| 114d. | Density image |
| 116a. | Density patch |
| 116b. | Density patch |
| 116c. | Density patch |
| 116d. | Density patch |
| 116e. | Density patch |
| 130. | Text |
| 132. | Text |
| 134. | Text |
| 136. | Text |
| 160. | Control strip |

What is claimed is:

1. A control tool for monitoring a predetermined process condition in a photographic process, comprising:

a support element having a plurality of rows, each row having a plurality of visual density patches and representing a different process condition;

at least one of said rows is used for monitoring a process condition being monitored and at least one of the other of said rows identifies an out-of-control process condition; and said plurality of rows of visual density patches are designed to be correlated with a process control strip that has been processed in the photographic process to be monitored, said support element further having textual information identifying at least one process condition and describing the process condition that may need to be corrected in response to correlation of said control strip to said control tool.

2. A control tool according to claim 1 wherein said control strip is used to monitor a photographic paper process, said support element comprising photographic paper.

3. A control tool according to claim 1 wherein said at least one of said rows used for monitoring said process condition comprises at least two rows, one of said rows identifies an upper limit and one of said two rows identifies a lower limit.

4. A control tool according to claim 1 wherein said other row comprises at least one row outside the upper limit and at least one row outside the lower limit.

5. A control tool according to claim 1 wherein said plurality of rows each having density patches, each density patch identifies a different process parameter.

6. A control tool according to claim 1 wherein text information is provided that identifies possible causes of said out-of-control condition and possible remedies for correcting said out-of-control condition.

7. A control tool according to claim 1 wherein said control tool is used to monitor a photographic paper process.

8. A control tool according to claim 1 wherein said control tool is used to monitor a photographic film process.

9. A control tool according to claim 1 wherein said control tool is made of photographic media.

10. A control tool according to claim 1 wherein said control tool is made of photographic paper.

11. A control tool according to claim 1 wherein said control tool is made of photographic film.

12. A control tool according to claim 1 wherein said control strip after processing is placed between two standard process condition rows of the control tool.

13. A control tool according to claim 1 to said support media where a portion of the support media is cut away leaving a window for convenient comparison with the control strip.

14. A control tool according to claim 1 wherein the said comparative images icon or pictorial images rather than uniform patch images.

15. A control tool for monitoring a predetermined process condition in a photographic process, comprising:

a support element having two rows, each row having a plurality of visual density patches and representing a different process condition, one of said rows is used for monitoring an upper process limit condition and the other one of said two rows identifies a lower process limit condition; and said two rows of visual density patches are designed to be correlated with a process control strip that has been processed in the photographic process to be monitored, said support element further having textual information identifying at least one process condition and describing the process condition that may need to be corrected in response to correlation of said control strip to said control tool.

16. A control tool according to claim 15 wherein said plurality of rows each having density patches, each density patch identifies a different process parameter.

17. A control tool according to claim 15 wherein text information is provided that identifies possible causes of said out-of-control condition and possible remedies for correcting said out-of-control condition.

18. A control tool according to claim 15 wherein said control tool is used to monitor a photographic paper process.

19. A control tool according to claim 15 wherein said control tool is used to monitor a photographic film process.

20. A control tool according to claim 15 wherein said control tool is made of photographic film.

21. A control tool according to claim 15 wherein two rows of density patches each comprise a strip of processed film.

22. A control tool according to claim 15 wherein the said comparative images icon or pictorial images rather than uniform patch images.

* * * * *